US010625235B2

(12) United States Patent
Eden et al.

(10) Patent No.: US 10,625,235 B2
(45) Date of Patent: Apr. 21, 2020

(54) HYBRID PHOTOCHEMICAL/PLASMA REACTOR DEVICES

(71) Applicant: The Board of Trustees of the University of Illinois, Urbana, IL (US)

(72) Inventors: James Gary Eden, Champaign, IL (US); Sung-Jin Park, Champaign, IL (US); Charles Shin, Champaign, IL (US); Andrey Mironov, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 15/728,986

(22) Filed: Oct. 10, 2017

(65) Prior Publication Data

US 2018/0099257 A1    Apr. 12, 2018

Related U.S. Application Data

(60) Provisional application No. 62/406,018, filed on Oct. 10, 2016.

(51) Int. Cl.
*B01J 19/00* (2006.01)
*C01B 13/11* (2006.01)

(52) U.S. Cl.
CPC ......... *B01J 19/0093* (2013.01); *C01B 13/115* (2013.01); *B01J 2219/0086* (2013.01);
(Continued)

(58) Field of Classification Search
CPC .......... B01J 19/0093; B01J 2219/00783; B01J 2219/0843; B01J 2219/2419;
(Continued)

(56) References Cited

U.S. PATENT DOCUMENTS 6,194,833 B1  2/2001  DeTemple et al.
7,157,721 B1  1/2007  Blanchard
(Continued)

OTHER PUBLICATIONS

Polymer Chemistry: An Introduction, 3rd ed., Raymond B. Seymour and Charles E. Carraher, Jr. (1992), Ch. 9, pp. 277, 282-288, 302-303 (Year: 1992).*

(Continued)

*Primary Examiner* — Nicholas A Smith
*Assistant Examiner* — Colleen M Raphael
(74) *Attorney, Agent, or Firm* — Greer, Burns & Crain, Ltd.; Steven P. Fallon

(57) ABSTRACT

A method for generating a hybrid reaction flows feedstock gas that is also a plasma medium through microchannels. Plasma is generated with the plasma medium via excitation with a time-varying voltage. UV or VUV emissions are generated at a wavelength selected to break a chemical bond in the feedstock gas. The UV or VUV emissions are directed into the microchannels to interact with the plasma medium and generate a reaction product from the plasma medium. A hybrid reactor device includes a microchannel plasma array having inlets and outlets for respectively flowing gas feedstock into and reaction product out of the microchannel plasma array. A UV or VUV emission lamp has its emissions directed into microchannels of the microchannel plasma array. Electrodes ignite plasma in the microchannels and stimulating the UV or VUV emission lamp to generate UV or VUV emissions. One common or plural phased time-varying voltage sources drive the plasma array and the UV or VUV emission lamp.

15 Claims, 13 Drawing Sheets

(52) U.S. Cl.
CPC .............................. *B01J 2219/0093* (2013.01); *B01J 2219/0095* (2013.01); *B01J 2219/00783* (2013.01); *B01J 2219/00853* (2013.01); *B01J 2219/00936* (2013.01); *B01J 2219/0801* (2013.01); *B01J 2219/083* (2013.01); *B01J 2219/0807* (2013.01); *B01J 2219/0835* (2013.01); *B01J 2219/0841* (2013.01); *B01J 2219/0843* (2013.01); *B01J 2219/0894* (2013.01); *B01J 2219/2402* (2013.01); *B01J 2219/2419* (2013.01); *C01B 2201/22* (2013.01); *C01B 2201/82* (2013.01)

(58) Field of Classification Search
CPC ...... B01J 2219/00853; B01J 2219/0894; B01J 2219/2402; B01J 2219/0841; B01J 2219/0835; B01J 2219/083; B01J 2219/0807; B01J 2219/0801; B01J 2219/0086; B01J 2219/00936; B01J 2219/0093; B01J 2219/0095; C01B 13/115; C01B 2201/82; C01B 2201/22
USPC ........................................ 204/157.44, 157.63
See application file for complete search history.

(56) References Cited

U.S. PATENT DOCUMENTS

| | | | |
|---|---|---|---|
| 7,482,750 B2 | 1/2009 | Eden et al. | |
| 7,573,202 B2 | 8/2009 | Eden et al. | |
| 8,442,091 B2 | 5/2013 | Park et al. | |
| 8,492,744 B2 | 7/2013 | Eden et al. | |
| 8,497,631 B2 | 7/2013 | Eden et al. | |
| 8,547,004 B2 | 10/2013 | Eden et al. | |
| 8,864,542 B2 | 10/2014 | Eden et al. | |
| 8,870,618 B2 | 10/2014 | Eden et al. | |
| 8,890,409 B2 | 11/2014 | Eden et al. | |
| 8,968,668 B2 | 3/2015 | Eden et al. | |
| 9,390,894 B2 | 7/2016 | Eden et al. | |
| 2009/0159442 A1* | 6/2009 | Collier | C12Q 1/00 204/403.1 |
| 2010/0296978 A1* | 11/2010 | Park | H01S 3/03 422/186.04 |
| 2011/0129941 A1* | 6/2011 | Kumacheva | B01J 19/0093 422/130 |
| 2013/0071297 A1 | 3/2013 | Eden et al. | |
| 2016/0327310 A1* | 11/2016 | Dai | B01J 19/088 |
| 2016/0362351 A1* | 12/2016 | Nagaki | B01J 21/08 |
| 2018/0369778 A1* | 12/2018 | Tatoulian | B01J 19/088 |

OTHER PUBLICATIONS

J.H. Cho et al., "Propagation and decay of low temperature plasma packets in arrays of dielectric microchannels", Applied Physics Letters, vol. 101, 253508, Dec. 18, 2012.

S.-J. Park et al., "25 W of average power at 172 nm in the vacuum ultraviolet from flat, efficient lamps driven by interlaced arrays of microcavity plasmas", APL Photonics, vol. 2, 041302, Mar. 8, 2017.

S.H. Sung et al., "Interchannel optical coupling within arrays of linear microplasmas generated in 25-200um wide glass channels", Applied Physics Letters, vol. 97, 231502, Dec. 9, 2010.

* cited by examiner

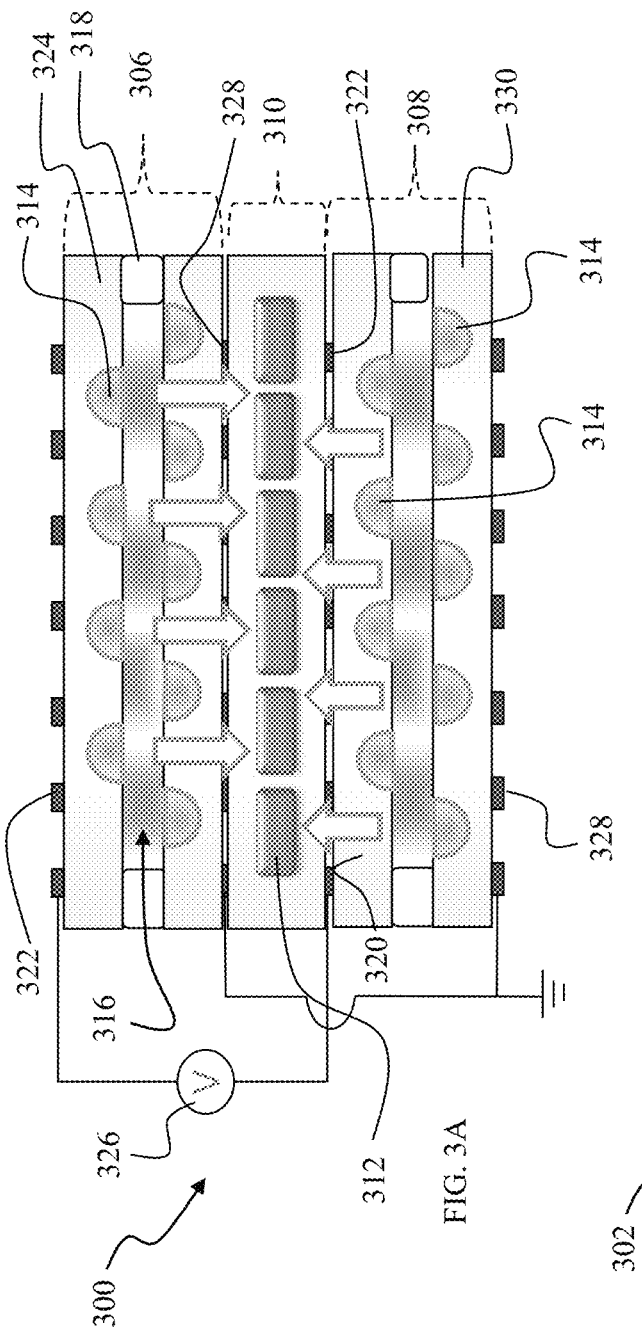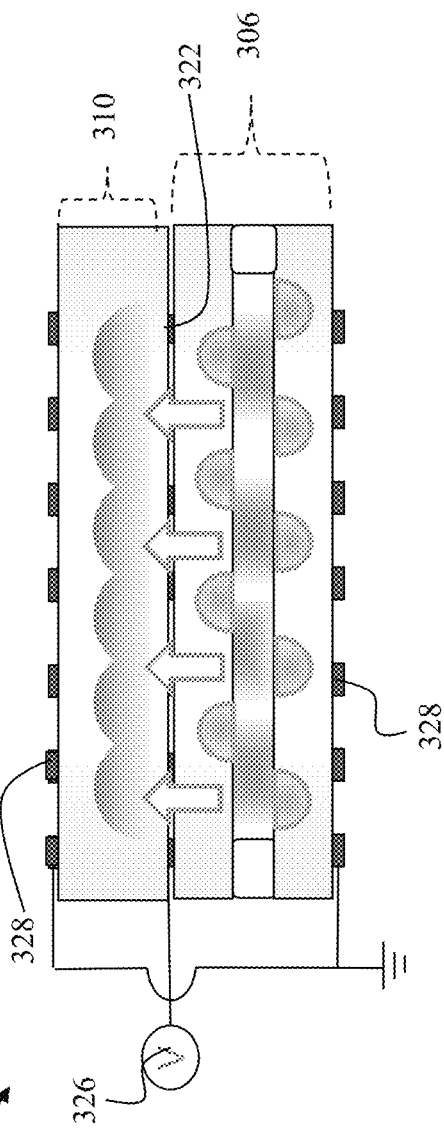
FIG. 3A
FIG. 3B

HYBRID PHOTOCHEMICAL/PLASMA REACTOR DEVICES

PRIORITY CLAIM AND REFERENCE TO RELATED APPLICATION

The application claims priority under 35 U.S.C. § 119 and all applicable statutes and treaties from prior provisional application Ser. No. 62/406,018, which was filed Oct. 10, 2016.

STATEMENT OF GOVERNMENT INTEREST

This invention was made with Government assistance under U.S. Air Force Office of Scientific Research grant No. FA9550-14-1-0146. The Government has certain rights in this invention.

FIELD OF THE INVENTION

The invention is in the field of chemical reactors that convert one or more gases or vapors into another gas, liquid, or solid. Other fields of the invention include microplasma reactor devices. Additional fields of the invention include plasma-chemical reactors, ozone generation, and plasma chemistry.

BACKGROUND

An example gas reaction process is widely used for the production of ammonia. For more than a century, the conversion of nitrogen and hydrogen gases into ammonia has been known and commercialized, but the conventional process involves heating the "feedstock" gases and is terribly energy-inefficient. In fact, approximately 2% of the total electrical production worldwide is devoted to the production of ammonia for the agricultural industry.

Plasma systems for generating specific chemical products have been investigated extensively over the past two decades, but the only commercially successful example of such reactors are those generating ozone for the disinfection of drinking water and wastewater treatment. Photochemical systems, in which light dissociates a molecule for the purpose of forming a new molecule, have proven to be of modest industrial value, with the exception of the photochemical production of Vitamin D for incorporation into milk and other products.

Plasma-chemical reactors and processes seek to use plasma to initiate desirable chemical reactions. Plasma can be used to promote chemical reactions in liquids and gases, and on the surfaces of solids. Present commercial plasma systems are used for printing, for treating water and for sterilizing surfaces, for example. An impediment to the wider adoption of commercial plasma-chemical reactors is the scale and expense of conventional atmospheric pressure plasma technology. The cost, size, weight, and high voltages characteristic of typical plasma-chemical reactors limit the commercial potential of conventional plasma reactor technology. Ozone treatment is a particularly attractive application of plasma-chemical technology but the cost, size, and weight of most existing systems restrict their value for many commercial uses.

Ozone can be produced when oxygen ($O_2$) molecules are dissociated by an energy source into oxygen atoms. Collisions of free oxygen atoms with oxygen molecules produce ozone ($O_3$) which is typically generated at the point of treatment because the lifetime of $O_3$ in air at atmospheric pressure is on the order of minutes. Ozone is the strongest oxidant and disinfectant available commercially. Mechanisms of disinfection using ozone include direct oxidation/destruction of bacterial cell walls, reactions with radical by-products of ozone decomposition, and damage to the constituents of nucleic acids. Presently available dielectric barrier discharge (DBD) systems for industrial scale production of ozone for municipal water treatment, for example, are large (up to 10-15 ft. in length) and have demanding power requirements (150-200 kVA). Furthermore, the conversion of feedstock gases into $O_3$ is often inefficient, thereby raising electrical power consumption and cost. Existing commercial processes for producing $O_3$ in large volume typically convert 15%-18% of the oxygen ($O_2$) feedstock gas into $O_3$. This low efficiency for the conversion of feedstock gas to ozone is a result of the fact that ozone is produced only within, or in the vicinity of, the streamers produced in air or oxygen by large volume DBD systems. Maintenance of such systems is also problematic owing to a large number of ceramic parts and fouling of device components by nitric acid. Existing dielectric barrier discharge technology is also sensitive to the level of organic impurities in the oxygen feedstock gas.

There are additional drawbacks to existing commercial plasma-chemical devices and systems. Dielectric barrier discharge structures, commonly used in present day commercial plasma systems operating at atmospheric pressure, are uncomplicated devices which apply high voltages to electrodes separated by a dielectric (often, glass or quartz) and the gas or vapor in which plasma is to be produced. Typical macroscopic reactors rely upon microdischarge streamers that are nominally 100 µm in diameter and statistically distributed in space and time. Efficiencies for the conversion of gas feedstock reactant(s) into the desired product are low which, for ozone generation, requires large volumes of oxygen (or air) flows to generate reasonable amounts of $O_3$. Moisture and organic contaminants in the feedstock gas are another problem with conventional ozone generating systems because the system can be fouled and rendered less efficient, or disabled, as a result of nitric acid build up on the reactor wall or on vacuum fittings. Similar difficulties are faced when attempting to process other gases such as carbon dioxide or water vapor in atmospheric pressure DBD-produced plasmas.

A portable ozone generator is described in U.S. Pat. No. 7,157,721 ("'721 patent"). In the '721 device, both sides of a glass or ceramic plate are coated with conductive materials to form electrodes having different areas. Such a device produces a corona discharge in the region lying outside the smaller of the two electrodes. An ozone device based upon this corona discharge mixes ozone with water in flow channels that are formed in plastic. No microchannels exist in the ozone-producing reactor. Another manufacturer provides a modular approach to ozone generation that is based upon corona discharge cells. However, because the corona discharge reactors are not flat and the plasma is not confined to microscopic channels, these reactors are not readily or easily combined and, in particular, are not amenable to being stacked. Furthermore, the voltages required of corona discharge systems are high (multi-kV) and conversion efficiencies (oxygen or air → ozone) are low.

The present inventors and colleagues have developed microplasma devices in various materials, including microcavity plasma devices and microchannel plasma devices. Microplasma devices are disclosed, for example, in the following patents, incorporated by reference herein. U.S. Pat. No. 8,968,668, entitled Arrays of metal and metal oxide microplasma devices with defect free oxide; U.S. Pat. No. 8,890,409, entitled Microcavity and microchannel plasma device arrays in a single, unitary sheet; U.S. Pat. No. 8,890,409, entitled Microcavity and microchannel plasma device arrays in a single, unitary sheet; U.S. Pat. No. 8,870,618, entitled, Encapsulated metal microtip microplasma device and array fabrication methods; U.S. Pat. No. 8,864,542, entitled Polymer microcavity and microchannel device and array fabrication method; U.S. Pat. No. 8,547,004, entitled Encapsulated metal microtip microplasma devices, arrays and fabrication methods; U.S. Pat. No. 8,497,631, entitled Polymer microcavity and microchannel devices and fabrication method; U.S. Pat. No. 8,492,744, entitled Semiconducting microcavity and microchannel plasma devices; U.S. Pat. No. 8,442,091, entitled Microchannel laser having microplasma gain media; U.S. Pat. No. 7,573,202, entitled Metal/dielectric multilayer microdischarge devices and arrays; U.S. Pat. No. 7,482,750, entitled Plasma extraction microcavity plasma device and method.

Another example device developed by several of the present inventors and colleagues produces low temperature plasma in microchannels. Specifically, Park et al. U.S. Pat. No. 8,442,091, incorporated by reference herein, discloses microchannel lasers having a microplasma gain medium. In that patent, microplasma acts as a gain medium with the electrodes sustaining the plasma in the microchannel Reflectors can be used in conjunction with the microchannel for obtaining optical feedback and lasing in the microplasma medium in devices of the invention for a wide range of atomic and molecular species. Several atomic and molecular gain media will produce sufficiently high gain coefficients that reflectors (mirrors) are not necessary. FIG. 4 of that patent also discloses a microchemical reactor that is suitable for air purification and ozone production because of the channel lengths and large power loadings (watts deposited per unit volume) of the plasma that are available. However, fabrication costs associated with channels of extended length present an obstacle to commercialization of this technology for applications that would benefit from ozone production.

Some of the present inventors and colleagues have developed other microplasma devices that produce high quality plasmas (i.e., uniform glows) in microchannels. For example, linear arrays of 25-200 µm wide channels have been fabricated in glass by replica molding and micropowder blasting and have been demonstrated to be capable of generating low temperature, nonequilibrium microplasmas. See, Sung, Hwang, Park and Eden, "Interchannel optical coupling within arrays of linear microplasmas generated in 25-200 µm wide glass channels," Appl. Phys. Lett. 97, 231502 (2010). Parallel microchannels have also been fabricated in nanostructured alumina ($Al_2O_3$) via a nanopowder blasting process, and shown to provide the capability for routing, and controlling the flow of, packets of low temperature, nonequilibrium plasma. See, Cho, Park and Eden, "Propagation and decay of low temperature plasma packets in arrays of dielectric microchannels," Appl. Phys. Lett. 101, 253508 (2012). Further development and research on these and additional microchannel structures by some of the present inventors and colleagues have resulted in the realization of ozone microreactors capable of generating ozone and fragmenting other gas molecules. See, [0062]-[0066] of commonly owned Eden et al., US Published Patent Application 2013/0071297, published Mar. 21, 2013. The ozone microreactor in the '297 application included 12 microchannels that supported a flow rate of 0.5 standard liters per minute (slm) and ozone generation efficiencies exceeding 150 g/kWh.

A modular approach is provided in Eden et al. U.S. Pat. No. 9,390,894, which is incorporated by reference herein. That patent discloses modular microchannel microplasma reactors, reactor modules and modular reactor systems that include pluralities of the modular microchannel reactors and reactor modules. The reactors, reactor modules, and modular systems are readily combined and scaled into large systems.

A photon emitting microcavity lamp has previously been patented by the inventor and colleagues U.S. Pat. No. 6,194,833, entitled Microdischarge lamp and array, which is incorporated herein. With an appropriate medium, the lamp can emit deep UV photons.

Prior UV/VUV lamps have been produced commercially, but are generally expensive, bulky and require a cylindrical geometry. Such lamps are available from Hamamatsu, Heraeus, and other manufacturers.

A series of high power and efficient ultraviolet/vacuum ultraviolet (UV/VUV) lamps was recently demonstrated by Eden Park Illumination of Champaign, Ill. One product is referred to as the Vacuum UltraViolet Lighting System, and provides mercury-free 172 nm (photon energy of 7.2 eV) radiation from an example 4"×4" (100 sq. cm) flat surface. More than 25 W of average power and greater than 600 W of peak power have been produced from such lamps. Park et al. describe the performance of the 172 nm lamp in the publication "25 W of average power at 172 nm in the vacuum ultraviolet from flat, efficient lamps driven by interlaced arrays of microcavity plasmas," APL Photonics 2, 041302 (2017). The overall ("wallplug") efficiency of these lamps is currently above 23%. These numbers are unprecedented in the deep UV and the VUV (wavelengths between 100 nm and 250 nm). Eden Park Illumination also provides flat microcavity VUV lamps at longer wavelengths, including some that can operate over a range of wavelengths, e.g., 220-260 nm, and others that operate at specific wavelengths, e.g., 185, 194, 207, 222, 226, and 308 nm.

Despite this accomplishment, however, the cost of photons in this spectral region remains high and reactors based solely on photochemistry do not appear to be attractive for many commercial processes at present. One reason for this assessment is that these lamps are available at present at only a few selected wavelengths that are not absorbed strongly by several prominent molecules of interest (e.g. carbon dioxide, methane, hydrogen, and nitrogen).

SUMMARY OF THE INVENTION

A preferred method for generating a hybrid reaction flows feedstock gas that is also a plasma medium through microchannels. Plasma is generated with the plasma medium via excitation with a time-varying voltage. UV or VUV emissions are generated at a wavelength selected to break a chemical bond in the feedstock gas. The UV or VUV emissions are directed into the microchannels to interact with the plasma medium and generate a reaction product from the plasma medium. The plasma medium can include a sensitizer having a chemical bond that can be broken by the UV or VUV emissions. The wavelength can be selected to break the chemical bond of a radical generated in the plasma. The plasma and UV or VUV emissions are preferably conducted in phase so that the UV or VUV emissions are generated at the same time as the plasma to allow photons to interact with plasma radicals.

A preferred hybrid reactor device includes a microchannel plasma array having inlets and outlets for respectively flowing gas feedstock into and reaction product out of the microchannel plasma array. A UV or VUV emission lamp has its emissions directed into microchannels of the microchannel plasma array. Electrodes ignite plasma in the microchannels and stimulating the UV or VUV emission lamp to generate UV or VUV emissions. One common or plural phased time-varying voltage sources drive the plasma array and the UV or VUV emission lamp.

BRIEF DESCRIPTION OF THE DRAWINGS

FIGS. 3A-3C are cross-sectional schematic diagrams of preferred embodiment hybrid photochemical-microplasma microchannel reactor devices that each include an integrated assembly of flat UV/VUV lamps and thin microchannel plasma devices into a stack or "sandwich" structure;

DETAILED DESCRIPTION OF THE PREFERRED EMBODIMENTS

Figure 1:
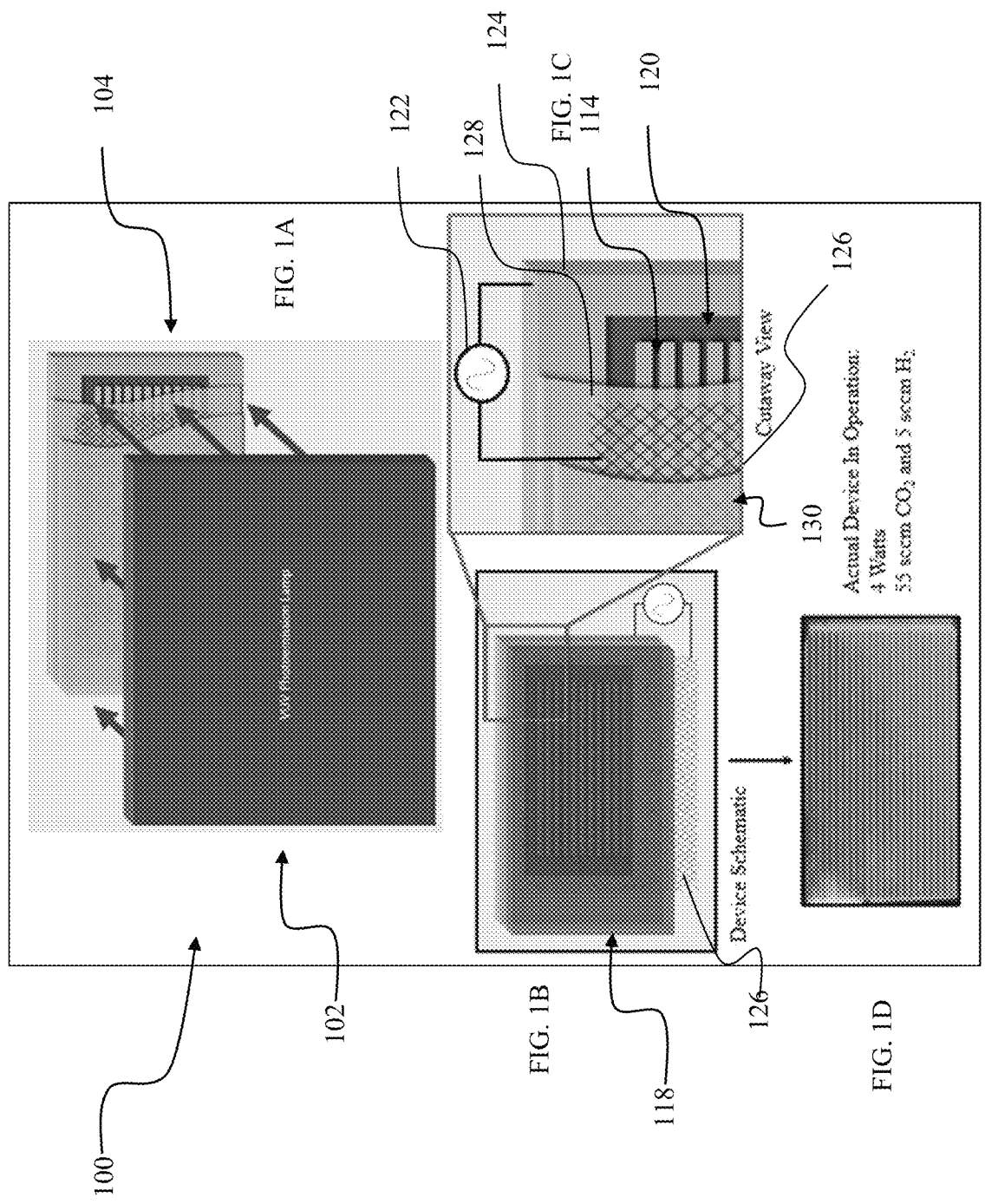
FIGS. 1A-1D include diagrams and an image of a preferred embodiment hybrid photochemical-microplasma microchannel reactor device and method of operation showing the illumination of an array of microchannel plasmas with the radiation of a flat UV/VUV lamp.

The present invention introduces a new form of plasmachemical system for converting one or more gases or vapors into another gas (or solid) of commercial value. In the past, such "reactors" have been classified as thermal (i.e., heating the input (feedstock) gases to a critical temperature), plasma (employing a plasma to dissociate or "unravel" the constituent gases) or photochemical (dissociating molecules with light). The vast majority of industrial processes involve the first of these which is generally energy intensive. We have demonstrated a hybrid reactor that combines the latter two processes (plasma and photochemical) by integrating recently-developed, high power vacuum ultraviolet lamps with arrays of microplasmas. The gas conversion processes does not occur at a significant rate if only the microplasmas or the lamps interact separately with the gas(es). That is, a strong synergy is observed when both the plasmas and the lamp(s) (emitting at one or more wavelengths specific to the molecule of interest) act on the input or feedstock gases. This combination effect appears to be the result of the plasma producing secondary molecules (i.e., fragments of the input gases) that absorb the lamp radiation (whereas the feedstock gases do not), resulting in the production of the desired species. This development will be of considerable industrial value because both the plasma and lamp are efficient, and the chemistry of such systems can be far more selective than thermal systems, where gas temperature and pressure are the only significant variables (i.e., "knobs to turn"). We have demonstrated this new approach on the dissociation of carbon dioxide with a microplasma array and a VUV lamp emitting at 172 nm.

The present invention is based on experiments at Illinois showing the combination of microplasma technology and flat, efficient high power UV/VUV lamps to have extraordinary properties because they work together to yield chemistry that is not possible, to a significant extent, when either the lamp or plasma is used alone. The synergy gained by combining these technologies arises from the fact that both are nonequilibrium devices, whereas thermal processing reactors are inherently equilibrium systems. That is, the performance of plasma reactors is often defined in terms of the average electron energy or "temperature" which is well above room or oven temperatures. That is, the electrons in a plasma are "hot" but the background gas is relatively "cold" (e.g., having a temperature near room temperature). Similarly, the lamps adopted here emit selectively over narrow wavelength intervals in the Uv/VUV spectral region. There are distinguished from blackbody lamps (such as arc lamps and high pressure mercury discharges) that produce a broad spectrum defined only by temperature. This means that the chemistry of the combined plasma/photochemical systems described here are capable of driving the chemistry far from equilibrium, that accessible to thermal reactors.

Experiments demonstrate that the efficiency for dissociating carbon dioxide, for example, increases significantly when an array of microplasmas is irradiated with 172 nm photons (energy of 7.2 eV). This synergy is unexpected because carbon dioxide itself absorbs weakly at 172 nm, and it appears that the VUV photons are interacting primarily with a transient species formed from carbon dioxide by the plasma. Similar effects are expected in a wide range of molecular dissociation or formation reactions. Accordingly, embodiments of the invention exploit the unique features of arrays of low temperature plasmas, confined to microcavities or channels, and the chemical selectivity of efficient UV/VUV lamps, to realize photochemical/plasma reactors capable of producing chemical products of value to industrial chemistry, the pharmaceutical industry, and biomedicine.

Preferred embodiments use a high power UV/VUV lamp developed by the inventors and colleagues. The lamp is described in Park et al., "25 W of average power at 172 nm in the vacuum ultraviolet from flat, efficient lamps driven by interlaced arrays of microcavity plasmas," APL Photonics 2, 041302 (2017), which is incorporated by reference herein. More than 25 W of average power and up to >800 W of peak power have been generated at $\lambda=172$ (hv=7.2 eV) in the vacuum ultraviolet (VUV) from the $Xe_2$ molecule in flat, $10\times10$ $cm^2$ lamps having an active area and volume of 80 $cm^2$ and <60 $cm^3$, respectively. Substrates include fused silica or magnesium fluoride. A key is that the lamp be flat and able to direct emissions into the microchannel plasma array. Other comparable flat lamps that can be matched/integrated to a microchannel array that have been developed or will be developed can be used.

The present invention provides a hybrid photochemical-microplasma microchannel reactor device. The device includes an array of a plurality of microchannel plasma devices, including electrodes arranged with respect to the plurality of microchannels to stimulate plasma generation in the plurality of microchannels upon application of suitable voltage wherein the electrodes are isolated from the microchannels by one or more dielectrics. At least one electrode of the microchannel array is covered with a substrate permeable (transmissive) to photons, a gas inlet to the microchannels, a gas product outlet from the microchannels, wherein a portion of the microchannels are between the gas inlet and gas product outlet, and a high power photoemission lamp, wherein the high power photoemission lamp is positioned so it can emit photons in the direction of the microchannel array, and wherein the photons are capable of passing through the substrate and entering the microplasma array Preferred embodiments will now be discussed with respect to the drawings. The drawings include schematic figures and partial views that are not to scale, but which will be fully understood by skilled artisans with reference to the accompanying description. Features may be exaggerated for purposes of illustration. From the preferred embodiments, artisans will recognize broader aspects of the invention.

FIGS. 1A-1D shows a preferred embodiment hybrid photochemical-microplasma microchannel reactor device 100 that includes a lamp 102 and a microchannel plasma array 104, which are shown in an exploded arrangement in FIG. 1A. FIG. 1B is a partially transparent schematic, and FIG. 1C shows a partial cut-away of the structure. The microchannel plasma array 104 includes a plurality of microchannels 106 with a plasma medium contained therein. The plasma medium can be one or more feedstock gases for a desired reaction, and it flows into an inlet 108 and exits as a reaction product from an outlet 120. A time-varying voltage source 122 is connected across an encapsulated electrode or set of electrodes in a substrate 124 of the microchannel plasma array 114 and a screen electrode 126. The lamp 102 includes another electrode (not shown) integrated into or onto its substrate. The microchannel plasma array 114 includes a cover/window 128 that is transparent to the emission wavelengths of the lamp 102. In preferred embodiments, the substrate 124 and encapsulated electrodes are formed of a metal oxide and metal, such as $Al_2O_3$ and Al, respectively. Another exemplary metal/metal oxide material system is titanium and titanium dioxide ($Ti/Ti_2O_2$). Another cover/window 130 seals the lamp 12. Other metal/metal oxide material systems will be apparent to artisans. FIG. 1D shows an example experimental device that was operated at 4 W with a flowing feedstock for the plasma medium comprising 55 sccm $CO_2$ and 5 sccm of $H_2$. In the experimental device, there were actually two screen electrodes between the lamp 102 and the plasma array 104, but this was only because the reactor was formed by combining an existing lamp with an existing microchannel plasma array. Specifically, the aluminum top cover normally provided to a commercial microchannel plasma array was removed and replaced with a fused silica window. A screen electrode was deposited or printed onto the window. The goal in fabricating such screen electrodes is to maximize optical transmission so that UV/VUV emission from the lamp is transferred most efficiently to the lamp. Patterns can be formed that can easily achieve 85% transmission, and more carefully formed grids can achieve about 95% transmission. An existing lamp with a window and screen electrode was then attached. A reactor fabricated from scratch would generally not include the second electrode.

It is often advantageous to also provide a sensitizer to the plasma medium. A sensitizer is a constituent of the feedstock gas mixture that, when partially or fully dissociated, releases an atom or radical that accelerates the dissociation or formation of another molecule. One example is ammonia vapor which, when irradiated at wavelengths below 200 nm, efficiently provides hydrogen atoms. It is well known that hydrogen atoms are able to promote the decomposition (dissociation) of many molecules or to the transformation of the molecule into another. The wavelength of the lamp in FIG. 1 is chosen such that the photon energy is sufficient to break a chemical bond that leads to a desired chemical reaction sequence. In the example, the 172 nm wavelength corresponds to 7.2 eV, which is sufficient to break the $NH_2$—H chemical bond in the ammonia molecule. If other sensitizers or reaction feedstocks without sensitizers are used, different wavelengths can be selected to break the relevant chemical bonds. Organic vapors and metal-halides, for example, may have weaker bonds than ammonia and, therefore, longer wavelength-emitting lamps can be used to break the bonds to initiate the chemical reaction sequence. A sensitizer is not always needed nor helpful. For example, in the case of water, its vapor absorbs at 172 nm which produces the hydroxyl radical OH. Subsequently, OH radicals assist in the dissociation of water vapor or other molecules in the plasma.

The 172 nm experimental lamp is made entirely out of fused silica, which is selected to support and transmit that wavelength. The lamp is generally fabricated from two material sheets of fused silica. One sheet includes the microcavity array, and the sheets are sealed together with a frit, and filled with xenon or other rare gas mixture. Electrodes are affixed external to the lamp and are often fabricated as grids comprising narrow lines of a metal such as a mixture of titanium and chromium which can be deposited by evaporation. Another option is screen printing of gold or other conductors. A window material having a wide bandgap is necessary to transmit photons in the VUV spectral region where the photon wavelength lies between 100 and 200 nm.

Example microchannels (in which the plasma is formed) can have widths in the range of about 25 μm to about 800

μm. Depths can be typically about 30 μm to about 300 μm. The lamp emissions can be at wavelength of about 100 nm to about 400 nm.

Figure 2:
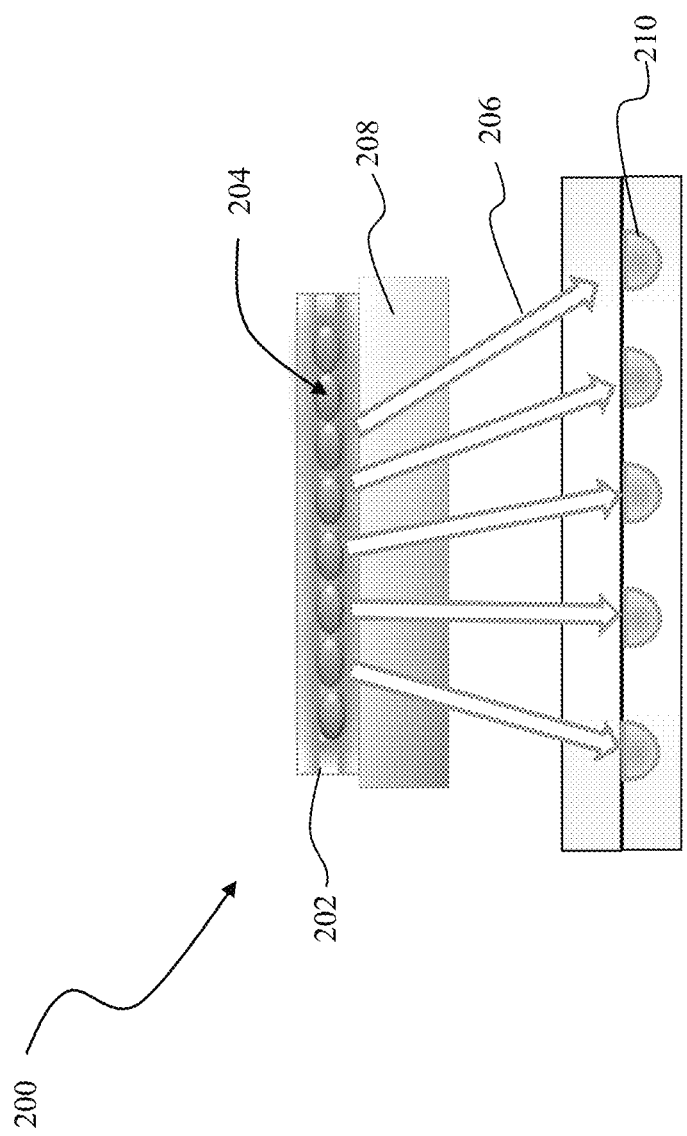
FIG. 2 is a schematic diagram of a preferred embodiment hybrid photochemical-microplasma microchannel reactor device and method for the selective coupling of UV/VUV photons produced by a lamp into the individual microchannels of an array with an optical device such as a phase mask or a lens array

FIG. 2 is a schematic diagram of a preferred embodiment hybrid photochemical-microplasma microchannel reactor device 200. For simplicity of illustrating a method for the selective coupling of UV/VUV photons produced by a lamp into the individual microchannels of an array, the view is exploded and omits electrodes and voltage source connections. A lamp 202 includes a plurality of microcavities 204 that emit UV/VUV photons 206. The photons 206 from the lamp 202 are guided with an optical device 208 such as a phase mask, Bragg grating or a lens array into microchannels 210 through a cover/window 212 of the microchannel plasma array 214. A Bragg grating can be designed, for example, to direct photons at a specific angle that maximizes the delivery of photons into the plasma medium.

Figure 3C:
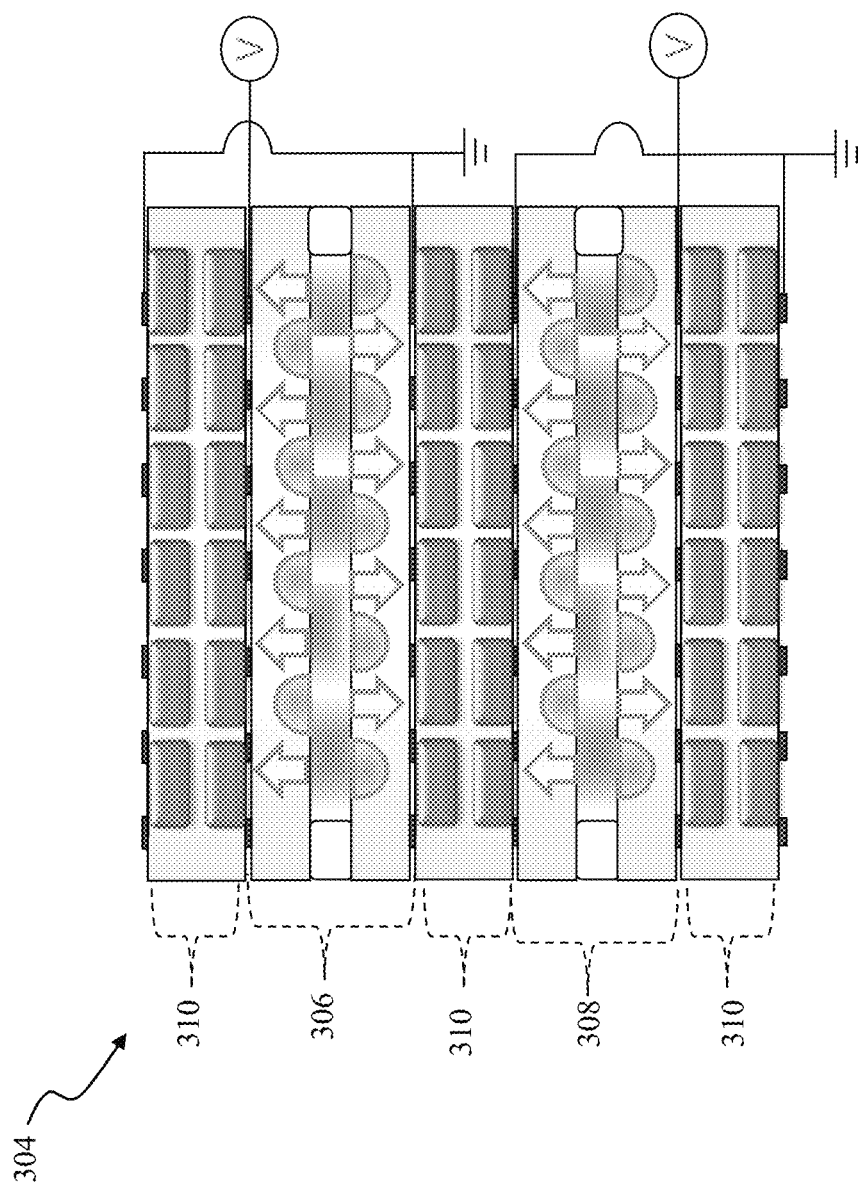

FIGS. 3A-3C are schematic diagrams of preferred embodiment hybrid photochemical-microplasma microchannel reactor devices 300, 302 and 304 that each include an assembly of flat UV/VUV lamps and thin microchannel plasma devices into a stack or "sandwich" structure that integrates one or more microchannel plasma arrays with one or more microcavity lamps. The hybrid reactor 300 includes two microcavity array lamps 306 and 308 with a microchannel plasma array 310 integrated between. Feedstock gas or a mixture that also serves as a plasma medium is fed through an array of microchannels 312. Both of the microcavity plasma lamps 306 and 308 have arrays of opposing microcavities 314 separated by a gap 316 that is vacuum sealed, for example, via spacers 318 and frit adhesive, and photons are emitted into the gap 316 and then into the microchannels 312. Electrode 322 (disposed external to and on substrate 324 of lamp 306 and between lamp 308 and microchannel plasma array 310) are connected to a voltage source 326. Electrodes shown as connected to ground are also connected to the "low side" of the voltage source in each of the figures. Electrode 328 (external to and on substrate 330 of lamp 308 and between lamp 306 and microchannel plasma array 310) are connected to ground. FIG. 3B shows a similar embodiment, with a single lamp 306 like that shown in FIG. 3A integrated to single array of microchannels 310. In FIG. 3B, FIG. 3C illustrates an embodiment with three arrays of microchannels 310 integrated with two lamps 306 that each include an array of microcavities. In FIGS. 3B and 3C, individual components not labelled with reference numbers are the same as those for the corresponding portions of the lamps 306, 308 and array of microchannels 310 in FIG. 3A.

In the reactor devices 302, 304, and 306, the lamps and plasma arrays are connected to the same voltage source. The voltage source generates a time-varying voltage such as a sinusoid. This provides an advantage and synergy that can also be realized by a separate voltage source having an adjustable phase or timing control. The point of the timing is to match the generation of radicals produced by the microplasmas with the arrival of photons from the lamp. Some radicals have a short lifetime and, therefore, having the same power supply for both the lamp and the plasma array ensures that photon arrival is timed to coincide with the presence of radicals in the plasma. This provides a strong synergy in the reaction whereby the arriving photons interact with the radicals in the plasma.

Figure 4:
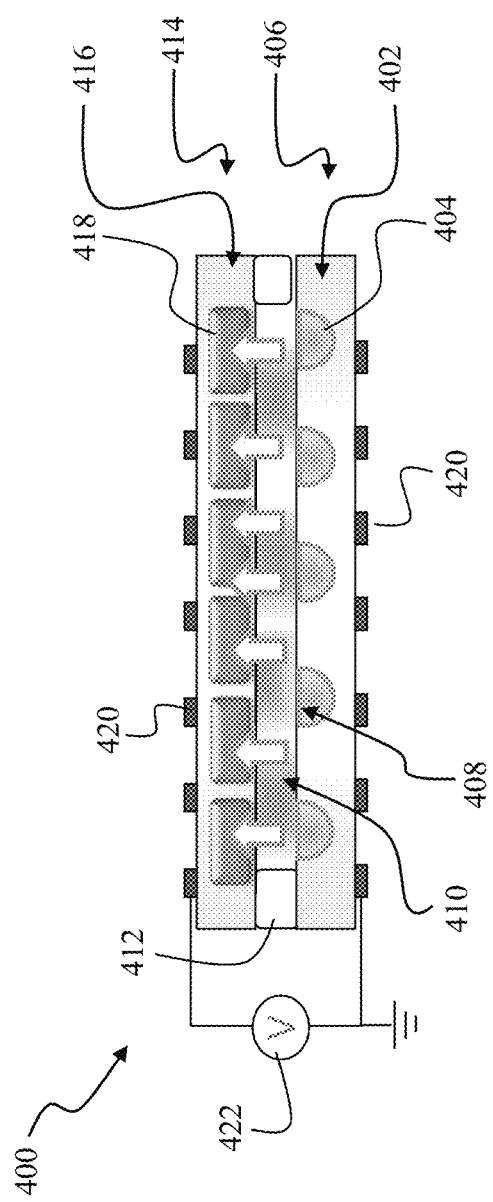
FIG. 4 is a schematic diagram of a preferred embodiment hybrid monolithic photochemical/plasma reactor in which the window of a conventional flat lamp has been removed and is sealed to an array of microplasma channels with an intervening, thin optical window (such as fused silica), and in which the UV/VUV lamp and the microchannel plasma array share the same electrodes.

FIG. 4 is a schematic diagram of a preferred embodiment hybrid monolithic photochemical/plasma reactor 400. A thin array 402 of microcavities 404 forms the lamp 406. Instead of a normal window or cover, the lamp 406 is sealed with a thin optical window 408 (such as fused silica). A gap 410 achieved with spacers 412 lies between the lamp 402 and a microchannel plasma device 414 including an array 416 of microchannels 418. The UV/VUV lamp 406 and the microchannel plasma device 414 share the same electrodes 420, and both the photon emission of the lamp 406 and the plasma in the microchannels is driven by a voltage source 422 through the electrodes 420.

Figure 5:
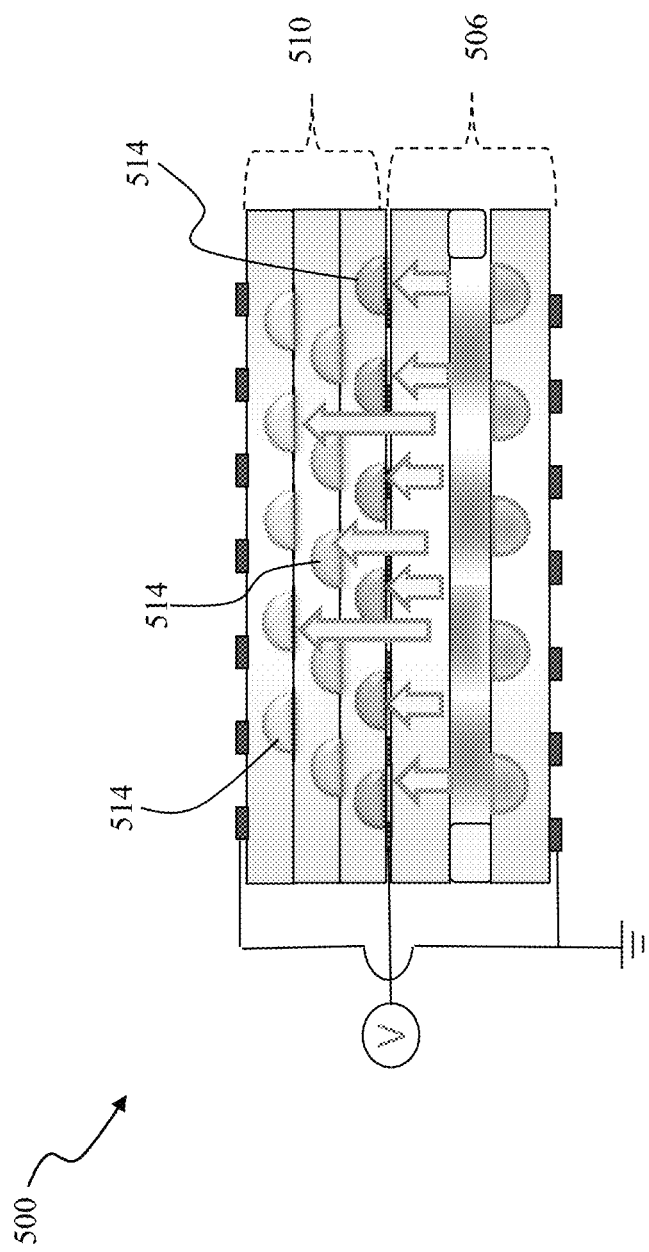
FIG. 5 is a schematic diagram of a preferred embodiment photochemical/microplasma system on a chip in which the treatment of the feedstock gases is staggered spatially so as to drive the production of a particular chemical product.

FIG. 5 is a schematic diagram of a preferred embodiment photochemical/microplasma reactor system on a chip 500. A lamp 506 is constructed in a manner similar to that described for lamps 306, 308, 406 above, and the arrangement is most similar to FIG. 3B. The reactor system 500 includes a plurality of staggered arrays 510 of microchannels 514. The electrodes and voltage application are as in FIG. 3B, but the treatment of the feedstock gases is staggered spatially so as to drive the production of a particular chemical product. As one example, microplasmas are efficient in producing various fragments of the methane molecule but the plasmas are not selective in generating a specific product because of the distribution of electron energies that are characteristic of plasmas. The addition of an efficient VUV lamp enables the chemistry to be driven to a specific product because the lamp radiation will be absorbed primarily by a radical such as methylene. Consequently, the combination of the plasma and lamp is able to yield chemical reactions and products of which neither the lamp or the plasmas are capable. Another motivation for staggering (or sequencing) the treatment of the feedstock gas(es) or vapor(s) is the different radicals produced by a plasma have different lifetimes. Separating the two regions allows for the number density of undesired radicals to decrease significantly prior to irradiating the remaining radicals with UV/VUV from a lamp. Such an arrangement, therefore, provides an additional tool to the chemist/engineer designing the reaction process for maximum efficiency.

Figures 6A, 6B:
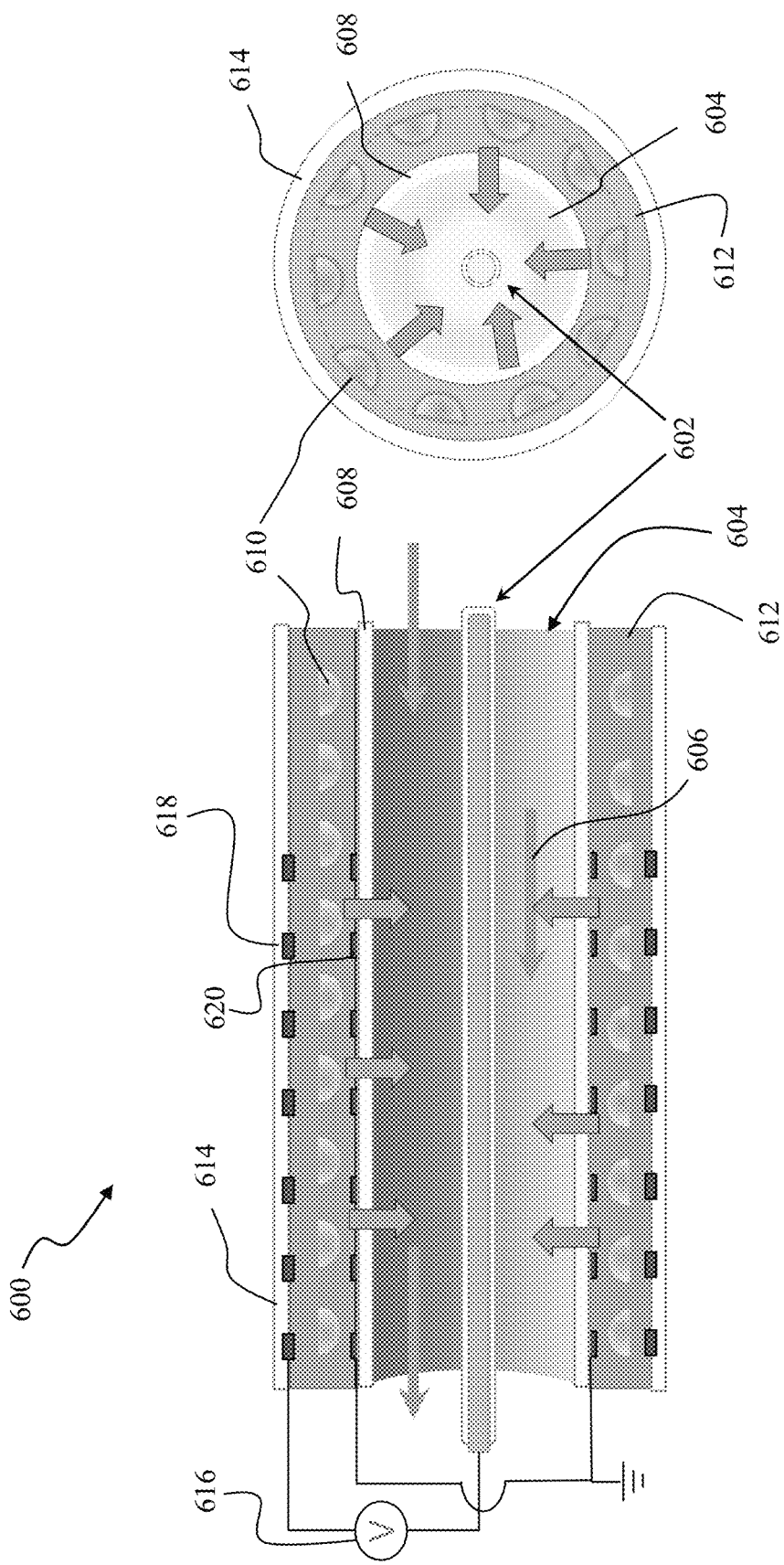
FIGS. 6A & 6B are cross-sectional and top view schematic diagrams of a preferred embodiment photochemical/microplasma reactor which has a coaxial electrode geometry having a micro-cylindrical or capillary form factor.

FIGS. 6A and 6B are schematic diagrams of a preferred embodiment photochemical/microplasma reactor 600 which has a coaxial electrode geometry in a micro-cylindrical or capillary form factor. A dielectric-encapsulated central electrode 602 is surrounded by a mico-cylindrical volume or capillary 604 that acts as a microchannel with a gas or liquid flow 606, serving as a feedstock, that is transformed into product as it traverses the micro-cylindrical volume or capillary 604 that is formed by a transparent dielectric micro-cylinder 608. A circumferential array of microcavities 610 forms a UV/VUV lamp sealed within a transparent dielectric 612. An external reflective layer 614 reflects photons back toward the micro-cylindrical volume or capillary 604. A voltage source drives the UV/VUV lamp and plasma generation in the micro-cylindrical volume or capillary 604 occurs owing to a connection between the central electrode 602 and an array of circumferential electrodes 618. Another array of circumferential electrodes 620 is connected to the ground/low side of the voltage source.

Figure 7A:
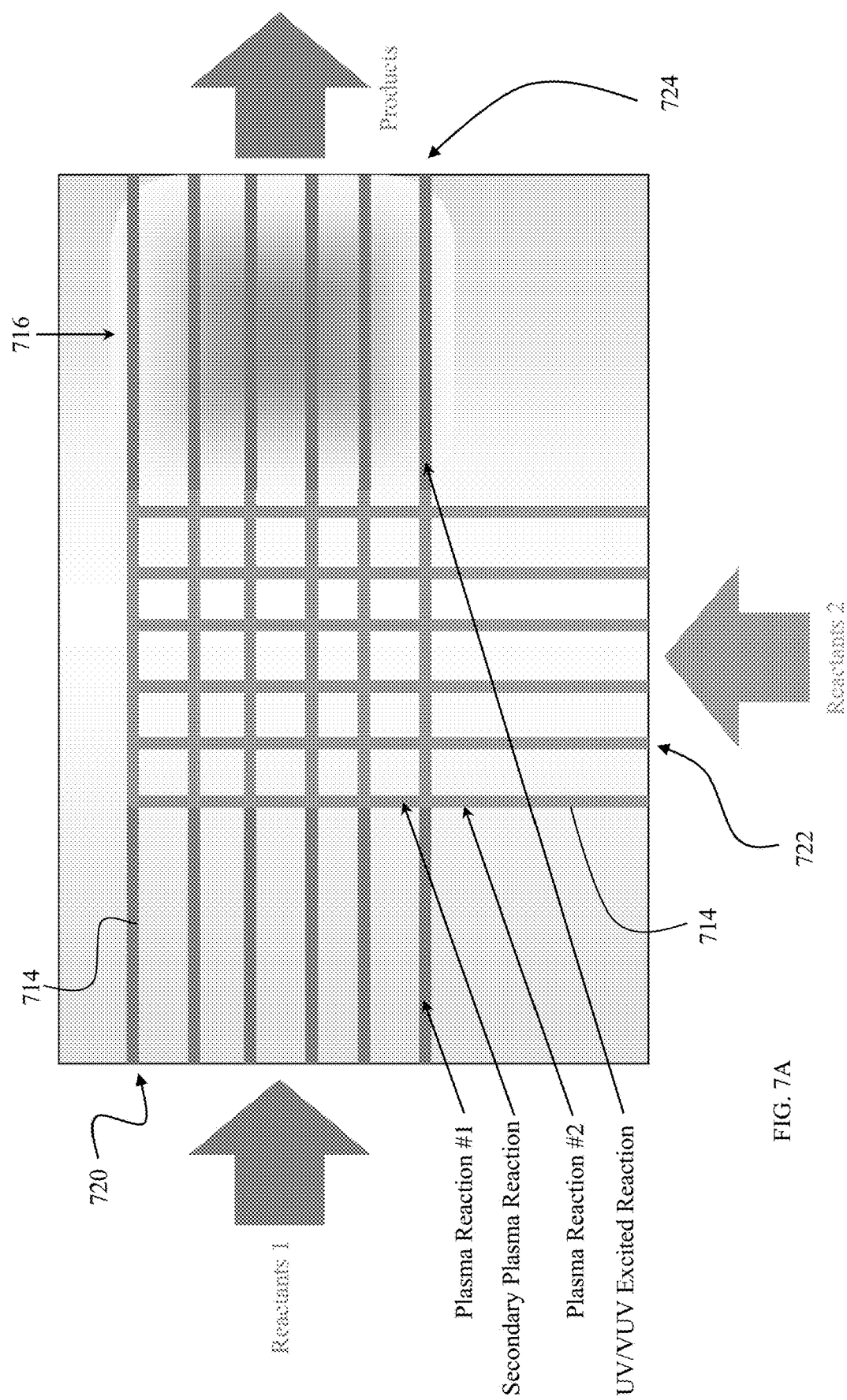
FIG. 7A is a schematic diagram top (plan) view of a preferred photochemical/microplasma reactor that leverages secondary reactions from the initial reactions and allows the sequencing of the photochemical and microplasma reactions to be interchanged.
Figure 7B:
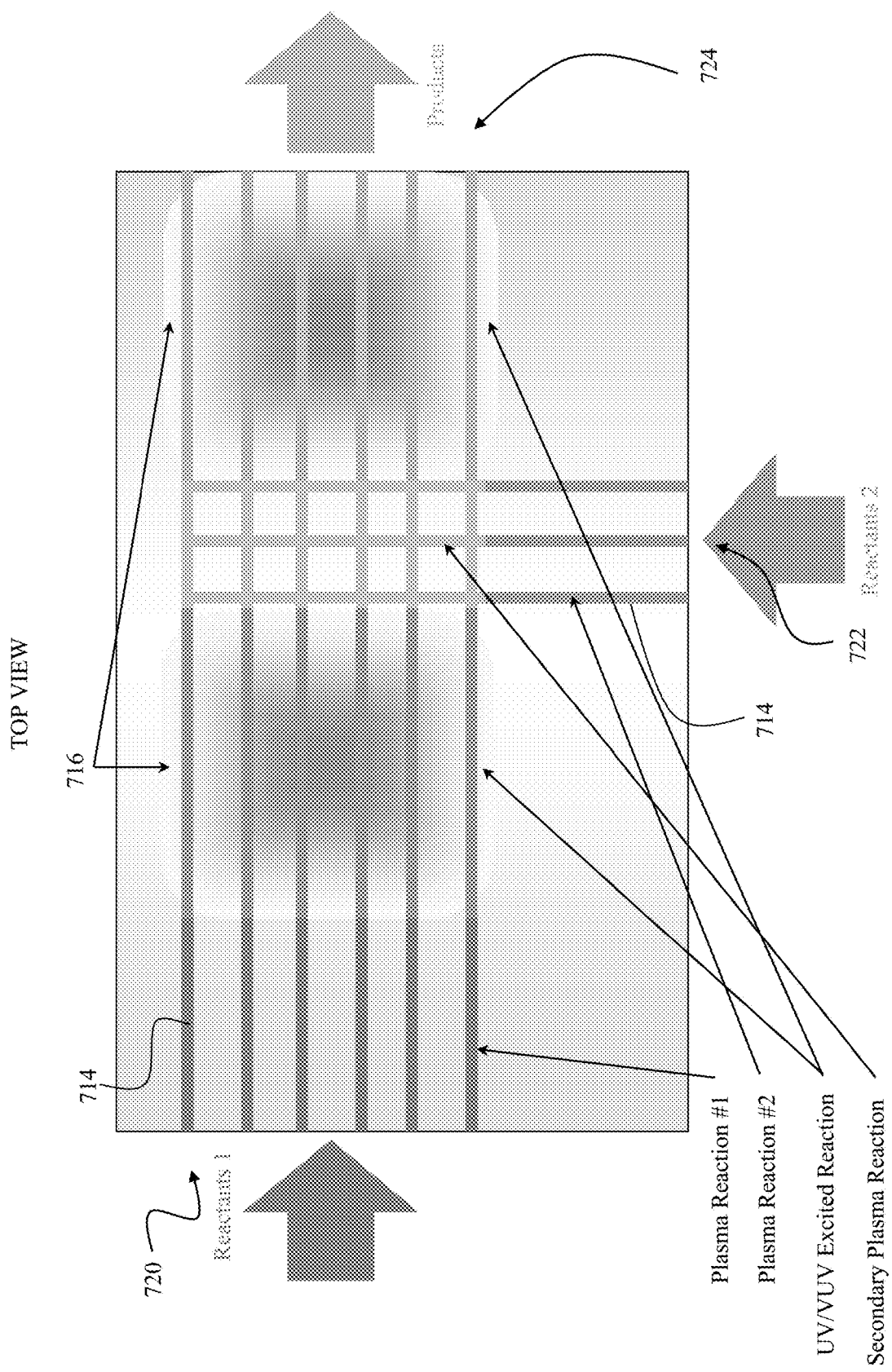
FIG. 7B is a schematic diagram top (plan) view of another preferred photochemical/microplasma reactor that leverages secondary reactions from the initial reactions by providing two reaction zones.

FIG. 7A is a schematic diagram in plan view of a preferred photochemical/microplasma reactor 700 that leverages one or more secondary reactions from the initial reactions and allows the sequence of the photochemical and microplasma interactions with the feedstock gas(es) to be interchanged. The reactor 700 can be structured according to any of the reactors of FIGS. 1-5, and FIG. 7A illustrates only the pattern of microchannels 714, and the location of emissions 716 from a UV/VUV lamp. The reactor 700 permits a multi-step reaction. First reactants enter a first set of inlets 720 and second reactants enter a second set of inlets 722. The first and second reactants individually react in the first reaction zones, before mixing and reacting in a secondary plasma reaction. Before exiting outlets 724, a final reaction can occur with the plasma and UV/VUV radiation. FIG. 7B is similar as it includes two UV/VUV reaction zones, but is otherwise labelled in accordance with FIG. 7A. In FIGS. 7A and 7B, all feedstock gases are not introduced at the same location. Rather, the initial feedstock gas or vapor serves as the source of a particular molecular radical or molecule that is necessary for the second stage in the process. Stacking such planar chemical reactors forms modules or sub-systems, thereby enabling the formation of larger reactors of any desired capacity.

Experiments were conducted with a prototype reactor in accordance with FIGS. 1A-1D. The experimental reactor consisted of a 4"×4" lamp purchased from Eden Park Illumination that operates at 172 nm and produces an optical fluence of 200 W/cm$^2$ at that wavelength. An array of microchannel plasma devices, comprising 25 channels, having a width of 500 um, was mounted onto the face of the lamp. FIG. 1D is a plan view of the array when it is operating separately within a mixture of $CO_2$ and hydrogen. The mass flow rate for these gases was 55 sccm and 5 sccm, respectively. One of the electrodes for the microplasma array was fabricated onto a substrate (e.g. fused silica or magnesium fluoride) so that, after the array is mounted onto the face of the lamp, the lamp radiation will be able to pass through the substrate ("window") and enter the microplasma array. In building such devices, the spacing between microchannels should be minimized so as to maximize interaction with the UV/VUV emission.

Figure 8B:
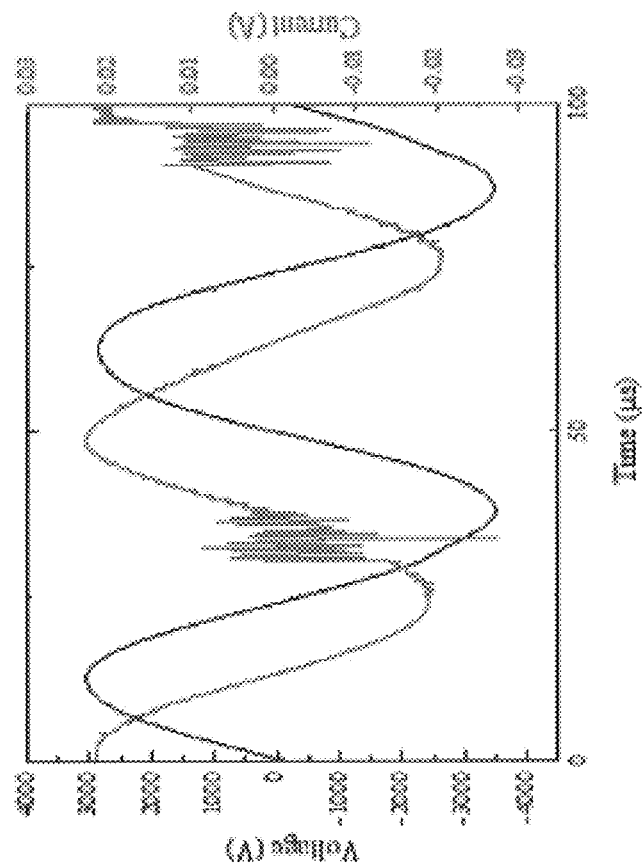
FIGS. 8A and 8B include observed voltage and current waveforms comparing the performance of the microplasma array without the assistance of a VUV lamp (FIG. 8A) and with the assistance of a lamp (FIG. 8B)
Figure 8A:
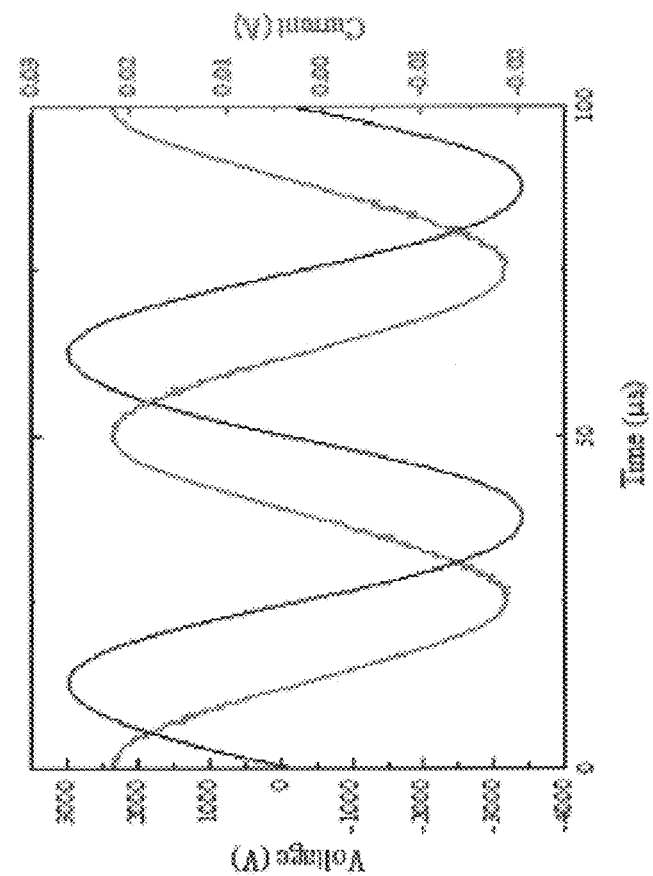
Figure 9:
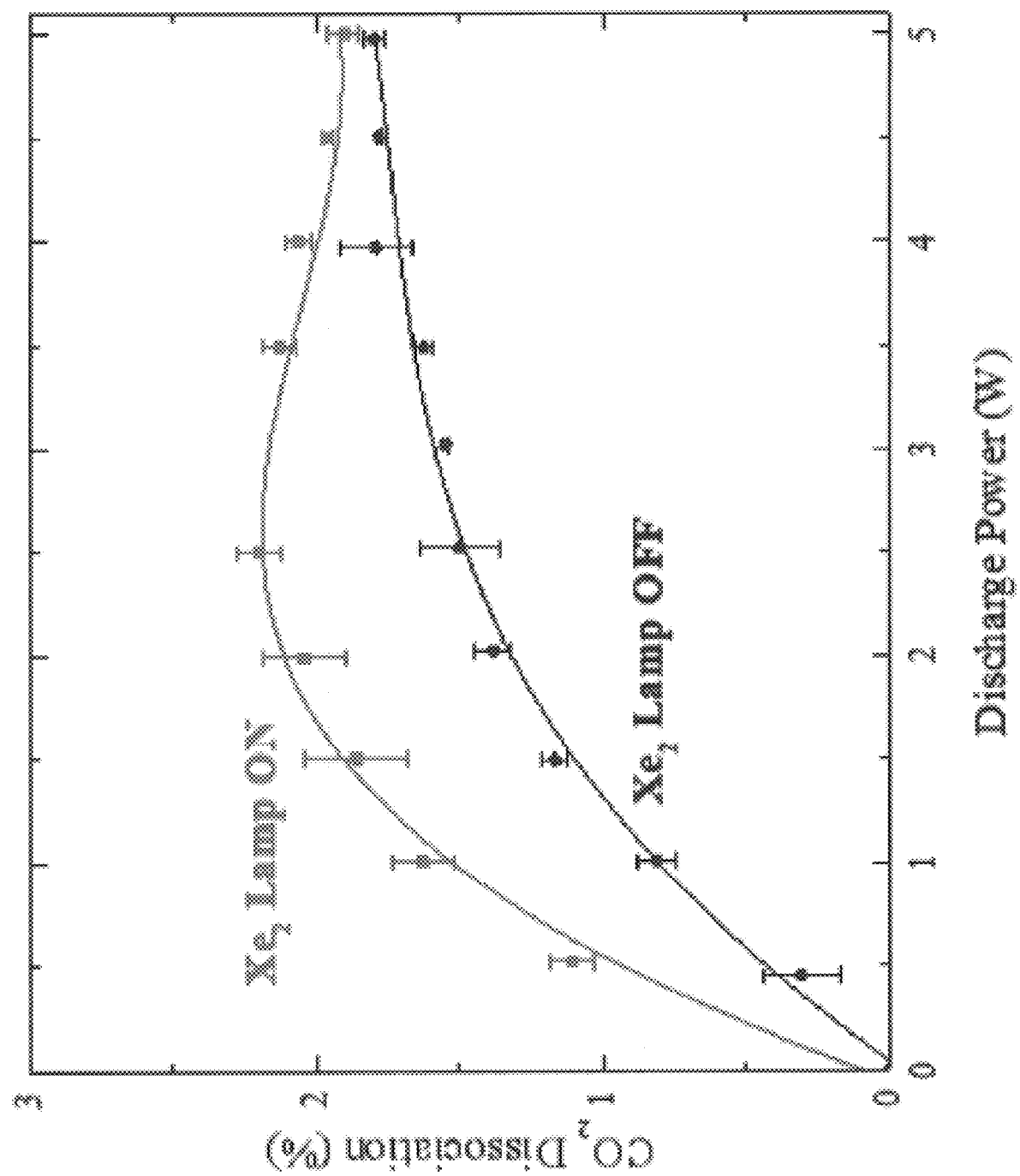
FIG. 9 includes data that compares CO2 production rates with and without the assistance of a lamp; no reaction is observed when the lamp alone interacts with (irradiates) the carbon dioxide feedstock gas.

FIGS. 8A and 8B include observed voltage and current waveforms comparing the microplasma array without the assistance of a lamp (FIG. 8A), and with assistance of a lamp (FIG. 8B). FIG. 9 includes data that compares $CO_2$ production rates with and without the assistance of a lamp.

The data show that, for $CO_2/H_2$ gas flows in the microplasma arrays, the electrical characteristics of the microplasma array is strongly aptered by the presence of the VUV photons from the lamp. FIGS. 8A and 8B show the voltage and current waveforms that are observed with the microplasma array operating, and with the lamp off (at left) or on (at right). With the lamp off, almost no current is observed (that is, the current sinusoid at left shows no current peaks) but igniting the lamp shows very strong current peaks immediately. This demonstrates that, despite the small fraction of the lamp radiation absorbed by the microplasma array in the sub-optimal experimental reactor, the lamp is altering the plasma chemistry significantly. Subsequent studies with a residual gas analyzer show that the combination of the lamp and microplasma array dissociates $CO_2$ much more efficiently than does the plasma alone. FIG. 9 shows the impact of the production of carbon monoxide (CO) when the lamp is turned on. The data presented here are quite dramatic because they show that the initiation of the $CO_2$ conversion process by the plasma is efficiently driven to completion by the lamp. This strongly suggests that the lamp photons each produce more than one CO product molecule. The implications of this for industrial chemistry are significant.

Figure 10:
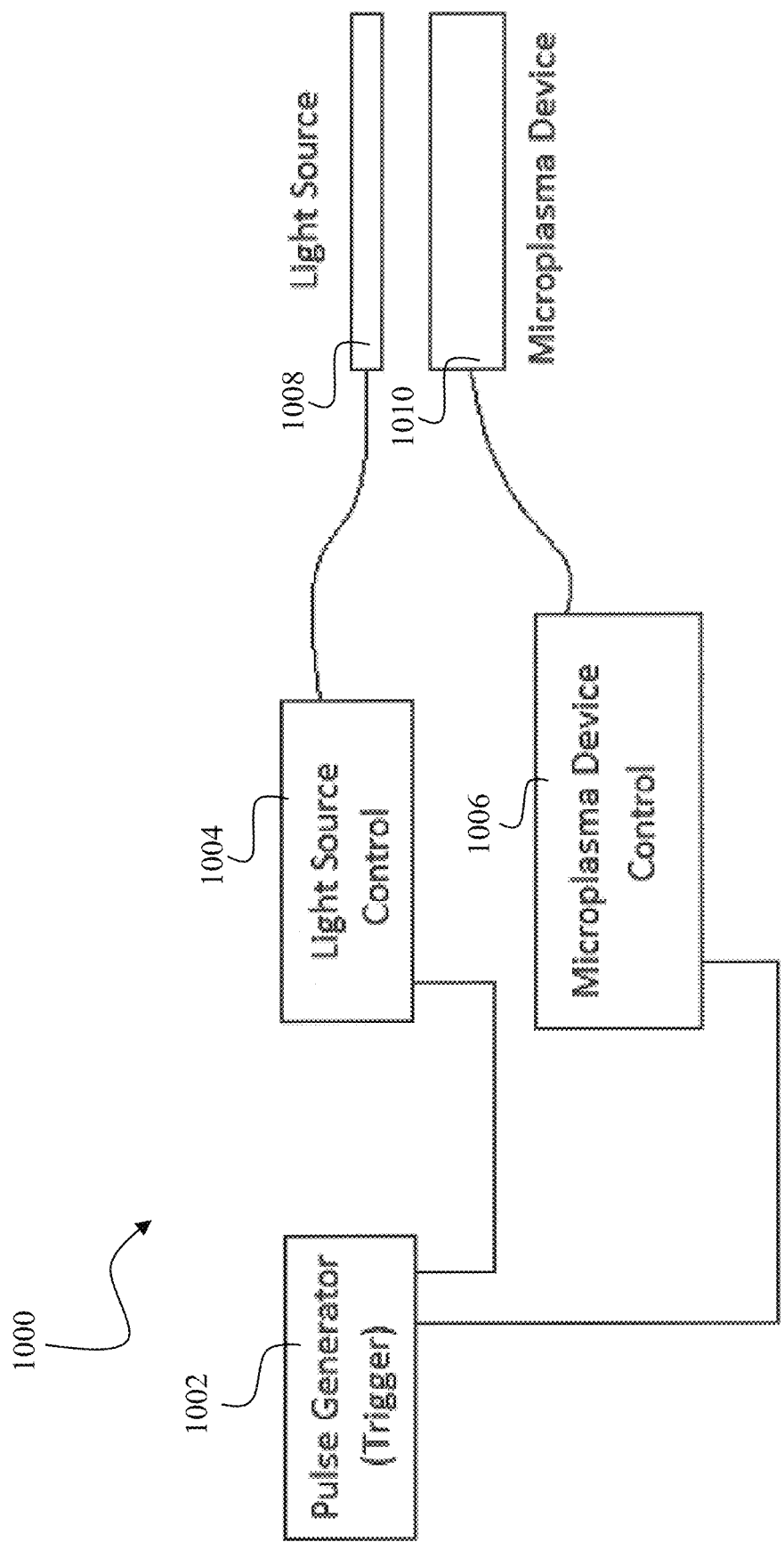
FIG. 10 is a schematic diagram of a preferred, synchronized system of the invention that permits control of molecular dissociation/formation rates through control of the time (or phase) delay between microplasma pulses and light source pulses.

FIG. 10 is a schematic diagram of a preferred synchronized system 1000 of the invention that permits control of the dissociation/formation rates through control of the time (or phase) delay between microplasma pulses and light source pulses. A pulse generator 1002 provides a timing baseline. A light source/lamp controller 1004 and microplasma control device use this as a reference, and control the respective light source/lamp 1008 and microplasma device array (constructed according to any disclosure embodiments to together form a reactor). The time (or phase) delay between the microplasma pulses and light source pulses is variable which allows control of the dissociation/formation efficiencies and/or rates.

Figure 11:
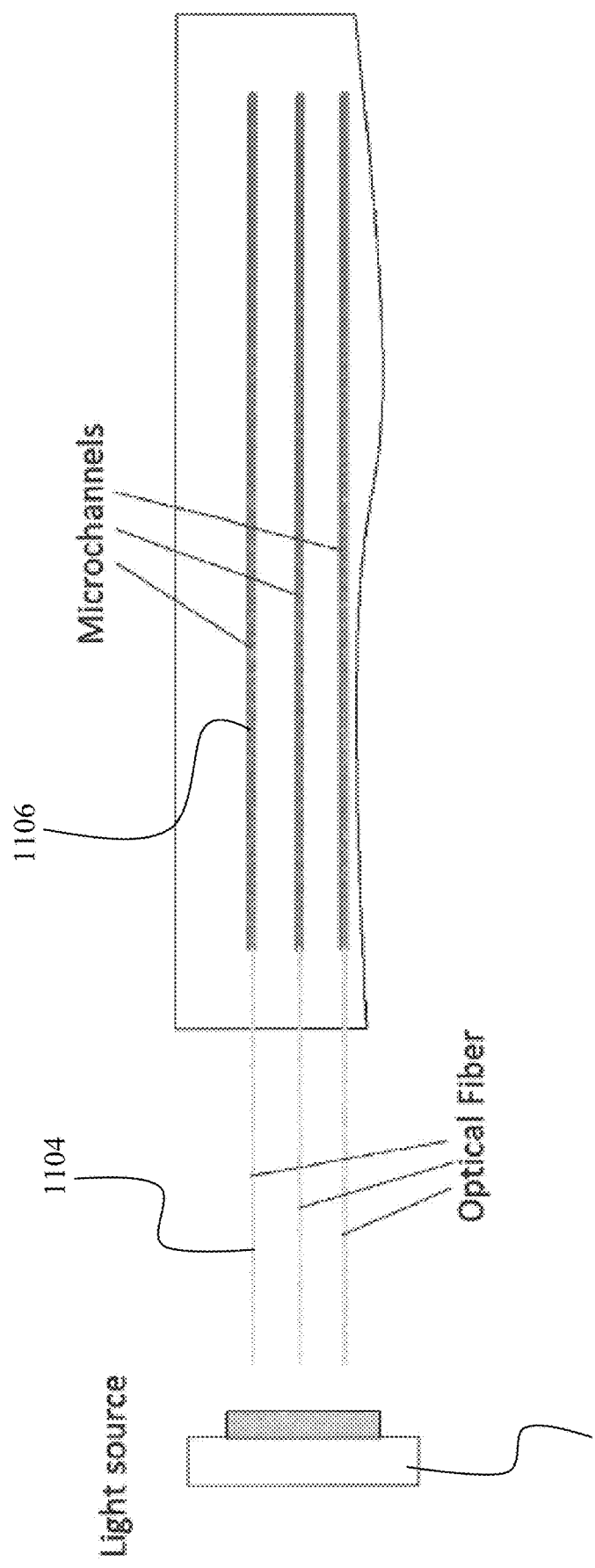
FIG. 11 is a schematic diagram illustrating a longitudinal pumping scheme of the invention.

FIG. 11 is a schematic diagram illustrating a longitudinal pumping scheme of the invention for another reactor. A light source 1100 emits UV/VUV light that is coupled into microchannels 1106 with reactant gas via optical fibers 1104. UV (as well as IR and visible) light may be delivered to the microplasma device by means of an optical fiber. The fiber 1104 has a collimating optic on its tip such that the light emerging from the fiber is not divergent or has a low divergence angle. This arrangement allows for longitudinal photoexcitation of the microplasma device. The light is coupled into the optical fiber using a set of optical elements or a fiber-to-fiber coupler in case the light source has a fiber output.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

The invention claimed is:

1. A method for generating a hybrid reaction, the method comprising steps of:
   flowing feedstock gas that is also a plasma medium through microchannels;
   generating microplasma with the plasma medium via excitation with a time-varying voltage;
   generating UV or VUV emissions at a wavelength selected to break a chemical bond in the feedstock gas;
   directing the UV or VUV emissions into the microchannels with a timing to coincide with presence of radicals produced in the microplasma to interact the radicals with the UV or VUV emissions and generate a reaction product of the radicals and the UV or VUV emissions.

2. The method of claim 1, wherein the plasma medium includes a sensitizer having a chemical bond that can be broken by the UV or VUV emissions.

3. The method of claim 1, wherein the wavelength is selected to break the chemical bond of the radicals generated in the microplasma.

4. The method of claim 1, wherein said generating generates the UV of VUV emissions from a microcavity lamp comprising an array of microcavities.

5. The method of claim 4, wherein the microchannels comprise an array of microchannels.

6. The method of claim 5, wherein a width of the microchannels width is in the range of about 25 μm to about 800 μm.

7. The method of claim 6, wherein a depth of the microchannels is about 30 μm to about 300 μm.

8. The method of claim 1, wherein lamp emits photons at a wavelength of about 100 nm to about 307 nm.

9. The method of claim 1, wherein the lamp emits photons at a wavelength of about 172 nm.

10. A hybrid reactor device comprising:
    a microchannel plasma array including inlets and outlets for respectively flowing gas feedstock into and reaction product out of the microchannel plasma array;
    a UV or VUV emission lamp having emissions directed into microchannels of the microchannel plasma array; and electrodes for igniting microplasma in the microchannels and stimulating the UV or VUV emission lamp to generate UV or VUV emissions;

and a common or multiple phased time-varying voltage sources for driving the electrodes and the UV or VUV emission lamp in phase with a timing to match the generation of radicals produced by the microplasma with the arrival of the UV or VUV emissions.

11. The device of claim 10, wherein the UV or VUV emission lamp comprises an array of microcavities arranged with respect to one or more arrays of electrodes to generate the UV or VUV emission.

12. The device of claim 10, wherein said electrodes are powered by a common time-varying voltage source.

13. The device of claim 10, wherein said microchannel plasma array and UV or VUV emission lamp are integrated together in a sandwich structure.

14. The device of claim 10, wherein said electrodes comprise screen electrodes.

15. The device of claim 14, wherein said screen electrodes have a UV or VUV transmission efficiency of between about 85-95%.

* * * * *